United States Patent
Maitre et al.

(10) Patent No.: US 12,422,104 B2
(45) Date of Patent: Sep. 23, 2025

(54) METHOD FOR CONTROLLING PURGING OF HYDROGEN FROM A HYDROGEN CIRCUIT OF A VEHICLE

(71) Applicant: Volvo Truck Corporation, Gothenburg (SE)

(72) Inventors: Julien Maitre, Chuzelles (FR); Yann Quibriac, Lyons (FR)

(73) Assignee: Volvo Truck Corporation, Gothenburg (SE)

(*) Notice: Subject to any disclaimer, the term of this patent is extended or adjusted under 35 U.S.C. 154(b) by 205 days.

(21) Appl. No.: 18/075,833

(22) Filed: Dec. 6, 2022

(65) Prior Publication Data
US 2023/0194054 A1 Jun. 22, 2023

(30) Foreign Application Priority Data
Dec. 22, 2021 (EP) .................................. 21216878

(51) Int. Cl.
*H01M 8/04223* (2016.01)
*F17C 13/12* (2006.01)

(52) U.S. Cl.
CPC ........ *F17C 13/12* (2013.01); *F17C 2221/012* (2013.01); *F17C 2250/043* (2013.01); *F17C 2270/0168* (2013.01); *H01M 8/04231* (2013.01)

(58) Field of Classification Search
CPC ........... H01M 8/04231; H01M 2250/20; F17C 13/12; F17C 2221/012; F17C 2270/0168
See application file for complete search history.

(56) References Cited

U.S. PATENT DOCUMENTS

| 10,069,157 B2* | 9/2018 | Lee ................. H01M 8/04225 |
| 11,705,561 B2* | 7/2023 | Kim ................. H01M 8/04753 429/445 |
| 2007/0015016 A1* | 1/2007 | Aoyama ................. B60L 58/33 429/444 |
| 2015/0375703 A1 | 12/2015 | Modi et al. |
| 2017/0016579 A1 | 1/2017 | Pelger et al. |

(Continued)

FOREIGN PATENT DOCUMENTS

| DE | 102010006518 A | 8/2011 |
| DE | 102013226913 A1 | 6/2015 |

(Continued)

OTHER PUBLICATIONS

Extended European Search Report for European Patent Application No. 21216878.5, mailed Jun. 14, 2022, 7 pages.

*Primary Examiner* — Gonzalo Laguarda
(74) *Attorney, Agent, or Firm* — Withrow & Terranova, PLLC

(57) ABSTRACT

A method for controlling purging of hydrogen from a hydrogen circuit system of a vehicle, the hydrogen circuit system having a hydrogen conduit being arranged in fluid communication with at least one hydrogen tank, the method being implemented by a hydrogen control system comprising at least one processing circuitry, the method comprising deactivating one or more vehicle functions and vehicle systems into a non-ignitable state in response to a control signal indicative of a request for purging the hydrogen circuit system, and performing purging of the hydrogen circuit system when the one or more vehicle functions and vehicle systems are set into the non-ignitable state.

16 Claims, 5 Drawing Sheets

(56) References Cited

U.S. PATENT DOCUMENTS

| | | | | |
|---|---|---|---|---|
| 2018/0175416 A1* | 6/2018 | Kim | ................... | H01M 8/04231 |
| 2021/0210777 A1* | 7/2021 | Ito | ..................... | H01M 8/04753 |
| 2023/0399986 A1* | 12/2023 | Minas | ...................... | F02C 9/46 |
| 2023/0402630 A1* | 12/2023 | Lee | ................... | H01M 8/04231 |

FOREIGN PATENT DOCUMENTS

| | | | |
|---|---|---|---|
| DE | 102017208807 A1 | 11/2018 | |
| DE | 102017209190 A1 | 12/2018 | |
| DE | 102017212491 A1 | 1/2019 | |
| DE | 102019213939 A1 | 3/2021 | |

* cited by examiner

METHOD FOR CONTROLLING PURGING OF HYDROGEN FROM A HYDROGEN CIRCUIT OF A VEHICLE

RELATED APPLICATIONS

The present application claims priority to European Patent Application No. 21216878.5, filed on Dec. 22, 2021, and entitled "METHOD FOR CONTROLLING PURGING OF HYDROGEN FROM A HYDROGEN CIRCUIT OF A VEHICLE," which is incorporated herein by reference in its entirety.

TECHNICAL FIELD

The present disclosure relates to a method for controlling purging of hydrogen from a hydrogen circuit system of a vehicle. The present disclosure also relates to a hydrogen control system for a vehicle. The hydrogen control system can at least partly be located remotely from the vehicle, e.g. at a remote control unit and/or in another vehicle.

The disclosure can be applied in relation to any type of vehicle operable from hydrogen or containing hydrogen tanks, e.g. hydrogen fuel for powering the propulsion system of the vehicle by means of a fuel cell system and/or a hydrogen internal combustion engine system. The vehicle may be a hybrid vehicle or an electric vehicle, such as a partly or fully electric vehicle. Although the disclosure will be described with respect to an electric truck, the disclosure is not restricted to this particular vehicle, but may also be used in other hybrid or electrical vehicles such as electric buses, and electric cars. The disclosure may also be applied in any other type of electric vehicle such as electric powered construction equipment, electric working machines e.g. wheel loaders, articulated haulers, dump trucks, excavators and backhoe loaders etc.

BACKGROUND

With the introduction of new energy storage systems in various types of vehicles, such as fuel cells in heavy-duty vehicles, there has been an increasing activity for developing new and adequate solutions for ensuring reliable operations of such systems, but also for other vehicle systems interacting with such systems. One area of particular interest in heavy-duty vehicles is the hydrogen supply system to vehicles containing e.g. fuel cell systems and/or hydrogen internal combustion engine, ICE, systems.

In contrast to vehicles operating based on a diesel ICE, vehicles operating on fuel cells or by means of a hydrogen ICE system may pose higher requirements on managing workshop maintenance and repair as well as roadside assistance of the vehicles. This is at least partly due to the low ignition energy of hydrogen. For example, in the event of an accident in which the hydrogen fuel system could be damaged such that the safe storage of the pressurized hydrogen gas is no longer ensured, there is a risk of the hydrogen gas leaking out from the system. When hydrogen gas blends with air at the release point or leakage point, all that is missing to have an explosion or fire is an ignition source.

Therefore, it is of interest to always implement high safety regulations for managing hydrogen vehicles. It may also be advisable to verify that the hydrogen supply system has been purged to an appropriate low level before performing maintenance on the vehicle. In particular, maintenance activities that could lead to a release of hydrogen should not be initiated until the hydrogen has been purged from the system. By way of example, hydrogen gas should be depressurized to a safe location away from personnel, preferably upwards due to the buoyancy of hydrogen.

The hydrogen gas leak may exist before the vehicle maintenance or may be created by the repair technician when manipulating hardware elements of the hydrogen system or hardware elements located close to the hydrogen system which may shake and damage parts of the hydrogen system.

However, there is a challenge to purge hydrogen supply systems and hydrogen tanks of heavy-duty vehicles due to the size of the tanks. By way of example, it may take several hours or even days before the level of hydrogen is low enough to permit intervention and repair of the vehicle and/or the hydrogen supply system.

Therefore, there still remains a need for an improved control of purging hydrogen from a vehicle during maintenance work or after a vehicle accident. In addition, it would be desirable to further improve the overall performance of the purging process of hydrogen from heavy-duty vehicles.

SUMMARY

It is thus an object of the present disclosure to at least partially overcome the above described deficiencies. The object is at least partly achieved by a method. The object is also at least partly achieved by the other independent claims. The dependent claims relate to advantageous embodiments.

According to a first aspect of the disclosure, there is provided a method for controlling purging of hydrogen from a hydrogen circuit system of a vehicle. The hydrogen circuit system having a hydrogen conduit being arranged in fluid communication with at least one hydrogen tank. The method is implemented by a hydrogen control system comprising at least one processing circuitry. The method comprises deactivating one or more vehicle functions and vehicle systems into a non-ignitable state in response to a control signal indicative of a request for purging the hydrogen circuit system; and performing purging of the hydrogen circuit system when the one or more vehicle functions and vehicle systems being set into the non-ignitable state.

In this manner, the proposed method allows for purging hydrogen from a vehicle in a more reliable and efficient manner before initiating any maintenance work on the vehicle or after a vehicle accident. By the provision of a method which takes advantage of deactivating one or more vehicle functions and vehicle systems into a non-ignitable state in response to a control signal indicative of hydrogen leaking from the hydrogen circuit system it becomes possible to purge hydrogen from the vehicle in a safer manner compared to hitherto known systems. In this manner, the proposed method provides for sequential action on different vehicle elements, components, and systems, to ensure safety. By way of example, the method may further comprise setting the vehicle in safe condition, including, but not limited to, shutting down any power/driving unit, setting the park brake and hazard warning indicators, inhibiting any vehicle element driving to spark generation or hot points.

In addition, the proposed method allows for purging hydrogen from the vehicle from a remote location.

In addition, the proposed method allows for reducing the downtime by having a safe mean to remotely purge one or several hydrogen tanks of the vehicle.

The method is thus at least partly based on the observation that hitherto known purging systems for vehicles often are based on alarm system, but lacks effective systems for purging hydrogen from vehicles in a reliable manner, e.g. controllable from a remote location from the vehicle.

Accordingly, in at least one example embodiment, the method is intended for controlling purging of hydrogen from the vehicle at remote location from the vehicle.

The proposed method is particularly suitable for electric vehicles including any one of a fuel cell system and a hydrogen ICE system.

Favourably, the method may be implemented by a remote-control system from the vehicle. The remote-control system may be arranged in communication with the one or more vehicle functions and vehicle systems and further in communication with a purging control arrangement arranged on the vehicle. The method may comprise performing purging of the hydrogen circuit system in response to a purging control signal from the remote-control system to the vehicle purging control arrangement.

Optionally, the vehicle purging control arrangement may comprise a controllable vent valve arrangement in fluid communication with the hydrogen circuit system, whereby performing purging of the hydrogen circuit system when the one or more vehicle functions and vehicle systems being set into the non-ignitable state is performed by operating the controllable vent valve arrangement to purge any hydrogen from the hydrogen circuit system. In this manner, the purging operation of hydrogen from the hydrogen circuit system can be controlled and completed in reliable and efficient manner.

Typically, the controllable vent valve arrangement is disposed in the hydrogen conduit of the hydrogen circuit system.

The controllable vent valve arrangement may be controllable by a plurality of control units arranged on the vehicle and in communication with the at least one processing circuitry.

The method may further comprise determining a hydrogen leaking state of any one of the at least one hydrogen tank and the hydrogen conduit. Typically, only the hydrogen tank or parts of the hydrogen conduit being subject to the hydrogen leak may be purged so as to ensure an empty system or component of hydrogen where there is a leak. Other hydrogen tanks or parts of the hydrogen circuit system that are still maintained in a leak-safe state may not necessarily be emptied of hydrogen or controlled for purging purposes.

In an example with a remote-control system, the control signal indicative of the determined hydrogen leaking state of any one of the at least one hydrogen tank and the hydrogen conduit may be transmitted to the processing circuity of the remote-control system.

The method may further comprise verifying that any equipment or systems of the vehicle in need of service is free of hydrogen before initiating maintenance of the equipment or systems. One example of an equipment or system is an ICE injection system. Another example of an equipment or system is a hydrogen tank. Yet another example of an equipment or system is a fuel cell stack. These types of equipment and systems may include one or more sensors for determining the state of the equipment or system. By way of example, the hydrogen tank may comprise a pressure sensor to monitor the pressure and to verify that the hydrogen tank is emptied.

It should be noted that the method can be implemented to monitor and control a number of different types of vehicle functions and vehicle systems, including various equipment, such as shutting down an ICE, stopping a cab heater, deactivating one or more electrical consumers producing heat or sparks. The electrical consumers may e.g. be any one of lighting system, high voltage battery system, a heater, a compressor, relays etc.

It is to be noted that the method may generally be performed by the hydrogen control system during use of the vehicle. Accordingly, any one of the steps of the method may be performed by the hydrogen control system during use of the vehicle.

According to one example embodiment, the steps of the method are performed in a sequence. However, at least some of the steps of the method can be performed concurrently. The method according to the example embodiments can be executed in several different manners. As mentioned above, the example embodiments of the method and the sequences of the methods, typically corresponding to the steps of the method, are executed by the hydrogen control system. In one example embodiment, any one of the steps of the method is performed by the hydrogen control system during use of the vehicle. The method may be continuously running as long as the vehicle is operative. The sequences of the method may likewise be performed by other types of components and by other technologies as long as the method can provide the associated functions and effects.

According to a second aspect of the disclosure, there is provided a computer program comprising program code means for performing the steps of the first aspect when the program is run on a computer or on processing circuitry of a control system.

According to a third aspect of the disclosure, there is provided a computer readable medium carrying a computer program comprising program code means for performing the steps of the first aspect when the program product is run on a computer or on processing circuitry of a control system.

Effects and features of the second and third aspects are largely analogous to those described above in relation to the first aspect.

According to a fourth aspect of the disclosure, there is provided a hydrogen control system for a vehicle. The vehicle comprises a hydrogen circuit system having a hydrogen conduit arranged in fluid communication with at least one hydrogen tank. The hydrogen control system comprises at least one processing circuitry in communication with a purging control arrangement arranged on the vehicle and configured to control purging of hydrogen from hydrogen circuit system. The hydrogen control system is further configured to deactivate one or more vehicle functions and vehicle systems into a non-ignitable state in response to a control signal indicative of hydrogen leaking from the hydrogen circuit system, and perform purging of the hydrogen circuit system when the one or more vehicle functions and vehicle systems being set into the non-ignitable state. Effects and features of the fourth aspect of the disclosure are largely analogous to those described above in connection with the first aspect.

By way of example, the purging control arrangement is configured to control purging of hydrogen from any one of the at least one hydrogen tank and the hydrogen conduit.

The hydrogen control system may be configured to determine an ignitable state of the one or more vehicle functions and vehicle systems, and, for any determined ignitable state of the one or more vehicle functions and vehicle systems, deactivating the one or more vehicle functions and vehicle systems into corresponding non-ignitable states.

As used herein, the term "ignitable state" refers to a condition of a vehicle system and/or a vehicle function that may cause hydrogen to ignite mixed even in small amounts with oxygen naturally present in the ambient air.

As used herein, the term "non-ignitable state" refers to a condition of a vehicle system and/or a vehicle function that is not causing a potential risk for flammability of hydrogen. In particular, the term "non-ignitable state" refers to a condition of a vehicle system and/or a vehicle function that is not causing a potential risk for flammability of hydrogen even if hydrogen would leak out from the hydrogen circuit system to the ambient atmosphere and/or become mixed with oxygen naturally present in the ambient air.

The hydrogen control system may comprise a remote-control system from the vehicle. The remote-control system may be arranged in communication with the one or more vehicle functions and vehicle systems and further in communication with the vehicle purging control arrangement. The vehicle purging control arrangement may be configured to control purging of the hydrogen circuit system in response to a purging control signal from the remote-control system.

The vehicle purging control arrangement may comprise a controllable vent valve arrangement disposed in the hydrogen circuit system. The controllable vent valve arrangement may be configured to purge any hydrogen from the hydrogen circuit system in response to a control signal indicative of hydrogen leaking from the hydrogen circuit system and that the one or more vehicle functions and vehicle systems is set into the non-ignitable state.

The controllable vent valve arrangement may be disposed in the hydrogen circuit system downstream a pressure regulator. By the arrangement of the pressure regulator, it becomes possible to regulate the pressure of the hydrogen in the hydrogen circuit system.

The hydrogen circuit system may be in fluid communication with at least one hydrogen consumer. A hydrogen consumer may e.g. be any one of a fuel cell system and a hydrogen internal combustion engine system. The hydrogen circuit system may be in fluid communication with at least one fuel cell system. The fuel cell system may comprise one or more fuel cell stacks having multiple fuel cells. The hydrogen circuit system may be in fluid communication with the hydrogen internal combustion engine system.

The controllable vent valve arrangement may be disposed in the hydrogen circuit system downstream the hydrogen consumer. The controllable vent valve arrangement may be disposed in the hydrogen circuit system downstream the fuel cell stack.

The controllable vent valve arrangement may be controllable by a plurality of control units. In addition, or alternatively, the controllable vent valve arrangement may be controllable by the processing circuitry of the hydrogen control system.

The hydrogen control system may at least partly be integrated into a vehicle system. The hydrogen control system may at least partly be integrated into a hydrogen consumer system. By way of example, the hydrogen control system may at least partly be integrated into hydrogen fluid circuit control system. In other examples, parts of the hydrogen control system are integrated in the vehicle and other parts of the hydrogen control system may be arranged in communication with the parts arranged in the vehicle. Hence, parts of the hydrogen control system may be integral parts of the vehicle.

The vehicle may be an electric vehicle, such as a fully or hybrid electrical vehicle, comprising an energy storage system and an electric propulsion system. The vehicle may be an electrical, hybrid, or plug-in hybrid vehicle comprising an electrical motor, wherein the energy storage system provides power to the electrical motor for providing propulsion for the electrical, hybrid, or plug-in hybrid vehicle.

The vehicle may typically comprise one or more drive units operable on hydrogen. By way of example, the vehicle may comprise a fuel cell system. In another example, the vehicle may comprise a hydrogen internal combustion engine system. In yet another example, the vehicle may comprise both a fuel cell system and a hydrogen internal combustion engine system. In other examples, the vehicle may comprise an electric propulsion system having both a battery system and a fuel cell system. The battery system and fuel cell system are generally in electrical connection with one or more electric machines.

Further features of, and advantages with, the present disclosure will become apparent when studying the appended claims and the following description. The skilled person realizes that different features of the present disclosure may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

Figure 1:
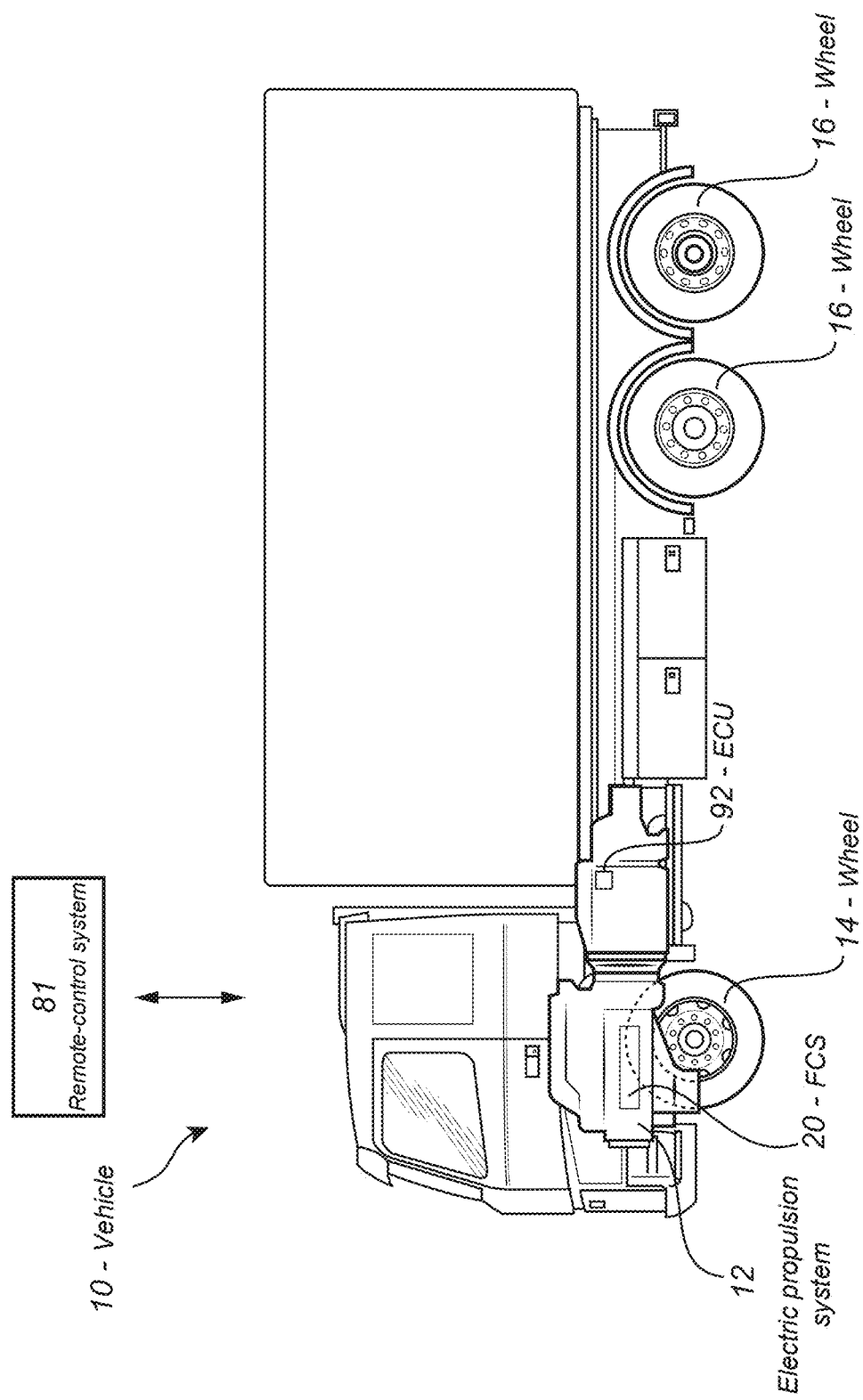
FIG. 1 is a vehicle in the form of a truck according to example embodiments of the disclosure.

With reference to the appended drawings, below follows a more detailed description of embodiments of the disclosure cited as examples.

DETAILED DESCRIPTION

The present disclosure will be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. The skilled person will recognize that many changes and modifications may be made within the scope of the appended claims. Similar reference characters refer to similar elements throughout the description.

Referring now to the drawings and to FIG. 1 in particular, there is depicted an exemplary vehicle, here illustrated as an electrical truck 10. In this example, the electric truck 10 is a fully electrical vehicle. The electrical truck 10 comprises an electric propulsion system 12 configured to provide traction power to the vehicle. By way of example, the electric propulsion system 12 comprises an electrical energy storage system 20 and an electrical machine (not shown). The electric machine is a traction motor for providing traction power to the vehicle, i.e. for propelling the wheels of the vehicle. The energy storage system is here a fuel cell system 20. Optionally the electric propulsion system may also include a battery system including one or more high voltage batteries. The fuel cell system 20 is connected to the electrical machine to provide power to the electrical machine, thereby the electrical machine can provide traction power to one or more ground engaging members, e.g. one or more wheels 14 and 16. The electric machine may generally include a conventional electric motor.

The electrical propulsions system 12 may further comprise additional components as is readily known in the field of electrical propulsions systems, such as a transmission (not shown) for transmitting a rotational movement from the electric motor(s) to a propulsion shaft, sometimes denoted as the drive shaft (not shown). The propulsion shaft connects the transmission to the wheels. Furthermore, although not shown, the electrical motor is typically coupled to the transmission by a clutch.

The traction motor (electric machine) is arranged to receive electric power from any one of the battery (not shown) and the fuel cell system 20. As further described herein, the fuel cell system 20 is here considered a vehicle system, or at least part of a vehicle system. In particular, the fuel cell system 20 is hydrogen consumer. Another example of a hydrogen consumer is a hydrogen internal combustion engine. The vehicle 10 also comprises a control unit 92 (see e.g. FIG. 2A or FIG. 2B) for controlling various operations and functionalities as will also be described in further detail below. The control unit is here the electronic control unit 92 of the vehicle 10. In addition, as illustrated in FIG. 1, the vehicle 10 is here in communication with a processing circuitry of a remote-control system 81. As will be further described herein, the remote-control system 81 is here an integral part of a hydrogen control system 80 (see FIG. 2A). In addition, the control unit 92 may also be an integral part of the hydrogen control system 80.

The fuel cell system 20 is of a conventional type and generally comprises one or more fuel cell stacks, each one having a number of fuel cells. By way of example, a number of fuel cells may form the so-called fuel cell stack. The fuel cells may likewise be arranged in multiple fuel cell stacks, each fuel cell stack comprising multiple fuel cells arranged in a stack configuration. Further, each one of the fuel cells making up the fuel cell stack, and thus the fuel cell system 20, generally comprises an anode side receiving hydrogen as a fuel component and a cathode side receiving compressed air as another fuel component. While there are several different types of fuel cells, distinguished mainly by the type of electrolyte used, a so-called Proton Exchange Membrane (PEM) fuel cell is particularly suitable for use in heavy-duty vehicles, such as the vehicle 10 in FIG. 1. Hence, the fuel cell system is here a PEM fuel cell system 20. For the purposes of the proposed system and method, as described further herein, the fuel cell system 20 is schematically illustrated and only depicts the anode side, i.e. the cathode side is omitted for simplifying the illustration. Other components such as balance of plant components could also be included in the fuel cell system as are commonly used in the field of fuel cell system.

Figure 2A:
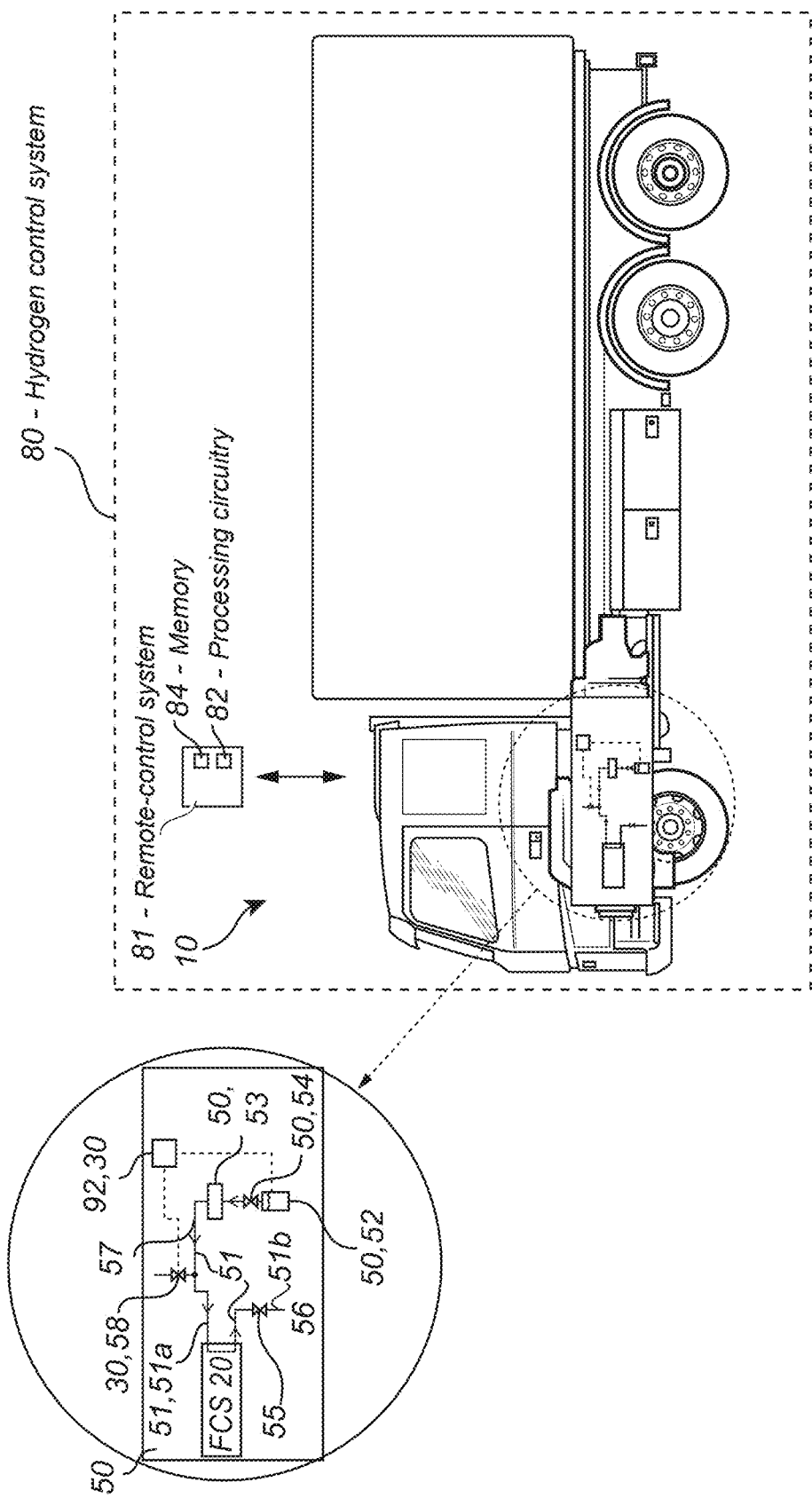
FIG. 2A conceptually illustrates an example embodiment of a hydrogen control system according to the disclosure, wherein the vehicle comprises a vehicle system in the form of a fuel cell system.

Turning now to FIG. 2A, there is depicted one example embodiment of a hydrogen control system 80 for controlling the hydrogen circuit system 50 containing and transferring hydrogen to one or more hydrogen consumers. The hydrogen control system 80 can be considered as hydrogen management control system and is configured to provide a safe handling of hydrogen during a leakage incident from the vehicle 10. As will be further described herein, the hydrogen control system 80 here comprises a remote-control system 81 for a remote control of the hydrogen circuit system 50.

As mentioned in relation to FIG. 1, the vehicle system may be a fuel cell system 20, or at least comprise a fuel cell system 20. In FIG. 2A, the vehicle 10 comprises the fuel cell system 20, as illustrated further in the enlarged view of FIG. 2A. The vehicle includes one or more hydrogen fuel system components for controlling supply of hydrogen to the anode side of the fuel cells of the fuel cell system 20. These components may collectively be denoted as a hydrogen circuit system, as further described herein.

Figure 2B:
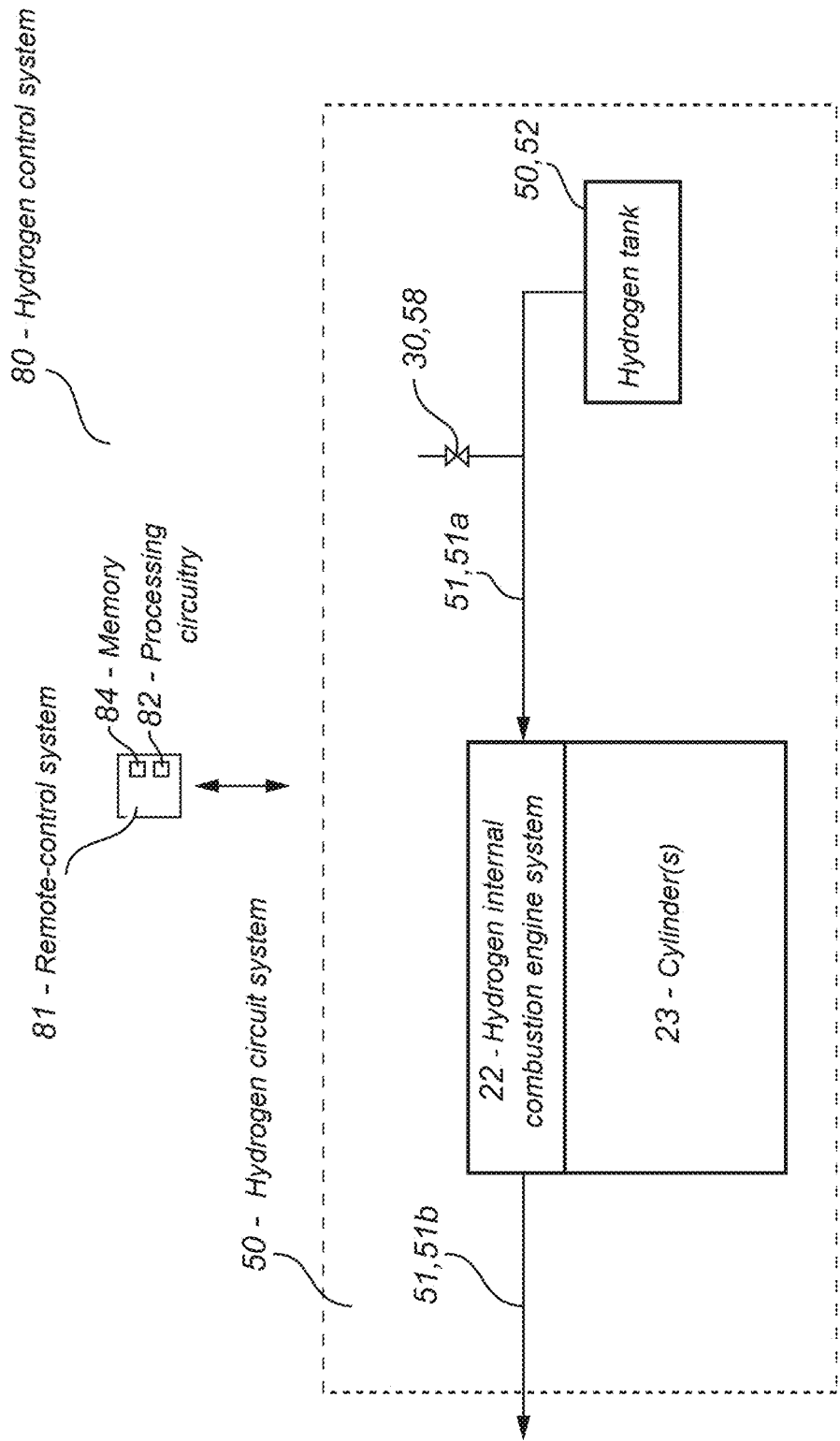
FIG. 2B conceptually illustrates an example embodiment of a hydrogen control system according to the disclosure, wherein the vehicle comprises a vehicle system in the form of a hydrogen internal combustion system.

Generally, the flow of hydrogen to the fuel cell system 20, or to any other types of hydrogen vehicle systems of the vehicle 10 is controlled during operation of the vehicle. By way of example, the control unit 92 is arranged and configured to control supply of hydrogen to a vehicle hydrogen consumer system comprising the fuel cell system 20. Another example of a vehicle hydrogen consumer system operable on hydrogen is a hydrogen internal combustion engine system, as also illustrated in FIG. 2B.

While referring again to FIG. 2A, there is depicted a hydrogen circuit system 50 in communication with the hydrogen control system 80 for the vehicle 10. The hydrogen circuit system 50 here comprises the fuel cell system 20. The fuel cell system 20 is one example of a hydrogen consumer. The hydrogen circuit system 50 comprises a hydrogen conduit 51 and a hydrogen tank 52. The hydrogen conduit 51 is configured to contain and transfer hydrogen 57. The hydrogen circuit system 50 is an integral part of the vehicle 10.

In some vehicles, the hydrogen circuit system 50 may include a plurality of hydrogen tanks. The hydrogen circuit system 50 is arranged in fluid communication with the hydrogen tank 52. The hydrogen tank 52 is disposed in the hydrogen circuit system 50. The hydrogen tank 52 and hydrogen conduit 51 may form a hydrogen gas fuel supply system. By way of example, the hydrogen circuit system 50 defines a hydrogen fuel supply line 51a configured to supply hydrogen gas to the fuel cell system 20, as indicated by an arrow in the enlarged view of FIG. 2A. Hence, the hydrogen circuit system 50 provides a fluid communication between the hydrogen tank 52 and the fuel cell system 20.

The hydrogen tank 52 is configured to contain the hydrogen fuel 57 in gaseous form. The hydrogen fuel 57 may also be partly arranged in liquid form in the hydrogen tank 52. The hydrogen fuel 57 is supplied to the fuel cell system 20 from the hydrogen tank 52 via the hydrogen supply line 51a of the hydrogen conduit 51. The hydrogen circuit system 50 is arranged and configured to contain and transport the hydrogen gas fuel 57, as illustrated by the arrows in FIG. 2A, and may optionally include one or more additional hydrogen fuel system components such as a fluid medium pump, fuel filter etc. These components are of conventional types and thus not further described herein.

In addition, the hydrogen circuit system 50 here also comprises a hydrogen exhaust line 51b configured to transport exhaust gases from the fuel cell system 20. The exhaust gases may bere contain hydrogen residues etc. The hydrogen exhaust line 51b terminates with an exhaust outlet 56.

The hydrogen circuit system 50 further comprises a vehicle purging control arrangement 30, as illustrated in FIG. 2A, and sometimes simply denoted as the purging control arrangement. The purging control arrangement 30 is arranged in the vehicle 10. In addition, the purging control arrangement 30 is arranged in fluid communication with the hydrogen circuit system 50. In particular, the purging control arrangement 30 is configured to control purging of hydrogen from the hydrogen circuit system 50. By way of example, the purging control arrangement 30 is arranged and configured to control purging of hydrogen from the hydrogen conduit 51. In addition, or alternatively, the purging control arrangement 30 is arranged and configured to control purging of hydrogen directly from the hydrogen tank 52.

In FIG. 2A, the purging control arrangement 30 comprises up to two controllable vent valve arrangements 55, 58. The controllable vent valve arrangements 55, 58 are each disposed in the hydrogen conduit 51 of the hydrogen circuit system 50. Each one of the controllable vent valve arrangements 55, 58 is here controllable by the control unit 92. Thus, each one of the controllable vent valve arrangements 55, 58 is here controllable by the remote-control system 81 in communication with the control unit 92.

The controllable vent valve arrangement 55 is disposed in the hydrogen circuit system 50 downstream the fuel cell system 20. In particular, the controllable vent valve arrangement 55 is disposed in the hydrogen exhaust line 51b. One example of a controllable vent valve arrangement 55 is a conventional on-off valve unit.

The controllable vent valve arrangement 55 is here configured to purge hydrogen from the hydrogen exhaust line 51b of the hydrogen circuit system 50 in response to a control signal indicative of hydrogen leaking from the hydrogen circuit system 50. In addition, the controllable vent valve arrangement 55 is here configured to purge hydrogen from the hydrogen exhaust line 51b of the hydrogen circuit system 50 after receiving, i.e. in response to, a control signal indicative that the vehicle functions and/or vehicle systems are set into their corresponding non-ignitable states.

In other examples, the controllable vent valve arrangement 55 is configured to purge hydrogen from the hydrogen exhaust line 51b of the hydrogen circuit system 50 in response to a control signal indicative of data only confirming that the one or more vehicle functions and vehicle systems is set into the non-ignitable state. Hence, the control signal may necessarily not always be associated with hydrogen leakage. By way of example, such type of configuration may be useful/applicable in case of maintenance of elements of the hydrogen circuit due to damage or regular preventive maintenance. In some situations, the fuel cell system or fuel cells of the fuel cell system may need to be changed for maintenance purposes. In other situations, the fuel cell system or fuel cells of the fuel cell system may need to be upgraded. In these types of situations, it may be useful to purge hydrogen from the hydrogen circuit system 50 in response to a control signal indicative of data only confirming that fuel cell system is set into the non-ignitable state. i.e. there is neither any flow of hydrogen to the fuel cell system nor any hydrogen contained in the fuel cell system.

By purging hydrogen from the controllable vent valve arrangement 55, it becomes possible to purge hydrogen after the fuel cell system 20.

Further, as illustrated in FIG. 2A, the controllable vent valve arrangement 58 is disposed in the hydrogen circuit system 50 upstream the fuel cell system 20. In particular, the controllable vent valve arrangement 58 is disposed in the hydrogen fuel supply line 51a. As such, the controllable vent valve arrangement 58 is arranged in-between the hydrogen tank 52 and the fuel cell system 20. One example of a controllable vent valve arrangement 58 is a conventional on-off valve unit.

The controllable vent valve arrangement 58 is here configured to purge any hydrogen from the hydrogen fuel supply line 51a of the hydrogen circuit system 50 in response to a control signal indicative of hydrogen leaking from the hydrogen circuit system 50. In addition, the controllable vent valve arrangement 58 is configured to purge hydrogen from the hydrogen fuel supply line 51a of the hydrogen circuit system 50 after receiving, i.e. in response to, a control signal indicative that the vehicle functions and/or vehicle systems are set into their corresponding non-ignitable states.

In other examples, the controllable vent valve arrangement 58 is configured to purge hydrogen from the hydrogen fuel supply line 51a of the hydrogen circuit system 50 in response to a control signal indicative of data only confirming that the one or more vehicle functions and vehicle systems is set into the non-ignitable state. Hence, the control signal may necessarily not always be associated with hydrogen leakage. By way of example, such type of configuration may be useful/applicable in case of maintenance of elements of the hydrogen circuit due to damage or regular preventive maintenance, e.g. preventive replacement of hydrogen tank after a shock with an external element and/or replacement of the H2 pressure regulator that delivers too high/low pressure compared to its expectation. In these types of situations, it may thus be useful to purge hydrogen from the hydrogen circuit system 50 in response to a control signal indicative of data only confirming that fuel cell system is set into the non-ignitable state.

Moreover, as illustrated in FIG. 2A, the controllable vent valve arrangement 58 is disposed in the hydrogen fuel system 50 downstream a pressure regulator 53. The pressure regulator is arranged and configured to lower the pressure from the hydrogen tank to an appropriate pressure for the fuel cell system 20. By way of example, the pressure regulator 53 is arranged and configured to reduce the pressure of the hydrogen from 700 bars to a pressure that can be used by the fuel cells of the fuel cell system 20, e.g. to a pressure level of about 2-3 bars. The pressure regulator 53 can also be controlled and operated by the control unit 92 and/or by the remote-control system 81.

By purging hydrogen from the controllable vent valve arrangement 58, it becomes possible to purge hydrogen from the fuel conduit 51*a* in a quick and efficient manner.

It should be readily appreciated that the purging control arrangement 30 can be provided with only one of the above-mentioned controllable vent valve arrangements 55, 58. Hence, in one example embodiment, the purging control arrangement 30 only includes the above-mentioned controllable vent valve arrangement 55 disposed in hydrogen exhaust line 51*b*. In another example embodiment, the purging control arrangement 30 only includes the above-mentioned controllable vent valve arrangement 58 disposed hydrogen fuel supply line 51*a*.

Moreover, as illustrated in FIG. 2A, the hydrogen circuit system 50 comprises a shut off valve 54 arranged in-between the hydrogen tank 52 and the pressure regulator 53. The shut off valve 54 is thus disposed in the hydrogen supply line 51*a*. The shut off valve 54 is generally an integral part of the purging control arrangement 30 and thus also here an integral part of the hydrogen control system 80. The shut off valve 54 is also here in communication with the control unit 92. Thus, the shut off valve 54 is controllable by the control unit 92. It should also be noted that if the hydrogen circuit system 50 includes several hydrogen tanks 52, there is generally disposed one shut valve downstream each one of the hydrogen tanks. The function of the shut off valve is to prevent supply of hydrogen from the tank(s) 52 to the hydrogen conduit 51. The shut off valve 52 is controlled by the control unit 92 to ensure a complete purge of the associated hydrogen tank 52.

Turning again to the hydrogen control system 80 in FIG. 2A, there is depicted one example embodiment of a hydrogen control system 80 comprising the remote-control system 81. The remote-control system 81 is arranged remotely from the vehicle 10. By way of example, the remote-control system 81 may be arranged in a control-tower (not illustrated). As such, the remote-control system 81 is a telematic remote-control system 81. Alternatively, or in addition, the remote-control system 81 may be arranged in another vehicle. Other possible locations for the remote-control system 81 is the integration of the remote-control system 81 in a fleet manager control system or the like.

The remote-control system 81 is arranged in communication with the one or more vehicle functions and vehicle systems and further in communication with the vehicle purging control arrangement 30. In FIG. 2A, the vehicle system is a fuel cell system 20. Hence, the remote-control system 81 is arranged in communication with the fuel cell system 20. The remote-control system 81 comprises a processing circuitry 82, as illustrated in FIG. 2A.

Favourably, the remote-control system 81 further comprises a storage memory 84 for storing relevant data relating to the control of the hydrogen circuit system 50 as well as the control of the components making up the hydrogen control system 80. The processing circuitry 82 is here in communication with the purging control arrangement 30. In FIG. 2A, the processing circuitry 82 is in communication with the purging control arrangement 30 via the control unit 92. The control unit 92 is generally an integral part of the purging control arrangement 30 and the hydrogen control system 80.

The control unit 92 is here configured to determine an ignitable state of the one or more vehicle functions and vehicle systems. By way of example, the ignitable state of a vehicle system is determined by comparing the state of the vehicle system with a threshold value. The threshold value is here indicative of the risk for causing an ignition. By way of example, the threshold may be related to the heat source, the spark producer of the vehicle function or vehicle system. In addition, for any determined ignitable state of the one or more vehicle functions and vehicle systems, the control unit 92 is also configured to deactivate the one or more vehicle functions and vehicle systems into corresponding non-ignitable states. By way of example, the non-ignitable state of a vehicle system is determined by comparing the state of the vehicle system with a corresponding threshold value. In a similar vein, the threshold value is here indicative of the risk for causing an ignition. By way of example, the threshold may be related to the heat source, the spark producer of the vehicle function or vehicle system. Hence, in the example when the control unit 92 is an integral part of the hydrogen control system 80, the hydrogen control system 80 is here configured to determine an ignitable state of the one or more vehicle functions and vehicle systems. In addition, for any determined ignitable state of the one or more vehicle functions and vehicle systems, the hydrogen control system 80 is also configured to deactivate the one or more vehicle functions and vehicle systems into corresponding non-ignitable states.

In this example embodiment, the hydrogen control system 80 is further configured to deactivate one or more vehicle functions and vehicle systems into a non-ignitable state in response to a control signal indicative of hydrogen leaking from the hydrogen circuit system 50. A vehicle system can e.g. be deactivated into its non-ignitable state by inhibiting any electrical power of some part of the vehicle where there are relays, light bulbs, accessories and/or electric motors that can create sparks. In a similar vein, for a vehicle system or vehicle function relating to, or corresponding to, the hydrogen ICE, the non-ignitable state can be set by requesting the stop of the hydrogen ICE.

Moreover, the hydrogen control system 80 is configured to perform purging of the hydrogen circuit system 50 when the one or more vehicle functions and vehicle systems are set into the non-ignitable state.

Turning again to the purging control arrangement 30 in FIG. 2A, the purging control arrangement 30 is configured to control purging of the hydrogen circuit system 50 in response to a purging control signal from the remote-control system 81.

In order to ensure a reliable operation of the vehicle 10, there may generally also be useful to monitor the supply of hydrogen in the hydrogen circuit system 50, e.g. by monitoring or estimating the hydrogen pressure in the hydrogen circuit system 50, so as to avoid detrimental leakage and/or a malfunction of the hydrogen circuit system 50, as well as reduce the impact from an unavoidable hydrogen leakage, e.g. due to an accident. As such, the hydrogen control system 80 is here also arranged and configured to monitor the supply of hydrogen in the hydrogen circuit system 50. The operation of monitoring the supply of hydrogen in the hydrogen circuit system 50 can be performed by one or more sensors (not illustrated).

In addition, the hydrogen control system 80 is here also arranged and configured to control supply of hydrogen to various vehicle systems operable by hydrogen. In FIG. 2A, the control unit 92 of the hydrogen control system 80 is configured to control supply of hydrogen from the hydrogen tank 52 to the fuel cell system 20 via the hydrogen fuel supply line 51*a*.

To sum up, the remote-control system 81 is configured to communicate with the control unit 92 so as to deactivate at least the fuel cell system 20 into the non-ignitable state in response to the control signal indicative of a request for purging the hydrogen circuit system 20. Optionally, the remote-control system 81 is also configured to deactivate any other vehicle functions and vehicle systems into their non-ignitable states in response to the control signal indicative of the request for purging the hydrogen circuit system 20.

After the fuel cell system 20 is set in its non-ignitable state, the remote-control system 81 is configured to perform purging of the hydrogen circuit system 50. Typically, the remote-control system 81 is also configured to verify that all other functions and systems being potential ignitable sources are set in their corresponding ignitable states prior to commence the operation of purging of the hydrogen circuit system 50.

The remote-control system 81 initiates purging of the hydrogen circuit system by transmitting the purging control signal to the vehicle purging control arrangement 30.

Upon receiving the purging control signal from the remote-control system 81, the vehicle purging control arrangement 30 is operable to control any one of the controllable vent valve arrangements 55, 58 to purge hydrogen from the hydrogen circuit system 50.

The purging control signal may either be linked to a detected hydrogen leakage from the hydrogen circuit system or linked to a user signal from an operator of the remote-control system 81.

The purging operation of the purging control arrangement 30 of the hydrogen control system 80 can be performed in several different manners. By way of example, the purging operation can be provided by so called natural venting. In addition, or alternatively, the purging operation can be provided by so called pressurizing-venting cycle purge, such as pressurizing-venting by using pressured air from the compressed air tank. This compressed air may be supplied from a compressed air system (not illustrated) for the braking and suspension system. Such compressed air system can be arranged in fluid communication with the hydrogen circuit system 50 so as to provide for pushing the hydrogen out from the hydrogen circuit system. Natural venting and pressurizing-venting cycle purge are well-common operations for purging hydrogen from a circuit, and thus not further described herein.

Moreover, in the illustrated example, only the hydrogen tank 52 or parts of the hydrogen conduit 51 being subject to the hydrogen leakage are purged so as to ensure an empty system. Other hydrogen tanks or parts of the hydrogen circuit system that are still maintained in a leak-safe state may not be emptied of hydrogen or controlled for purging purposes.

By way of example, the hydrogen leakage state is detected by a sensor (not illustrated). The sensor can be arranged adjacent the hydrogen circuit system 50. In other examples, the sensor can even be arranged on another location of the vehicle 10 or located in a workshop premises or nearby a technician. Optional, the technician can also notice a whistling from the hydrogen circuit system 50 without the need to wait for a confirmation from the hydrogen sensor disposed in or adjacent the hydrogen circuit system 50. In other systems and examples, the hydrogen leakage state can be detected and/or determined by an unexpected pressure drop on the hydrogen circuit system 50. Hence the hydrogen leakage state can be triggered in several different ways.

FIG. 2B illustrate another hydrogen circuit system 50 according to one example embodiment. In this example embodiment, the hydrogen consumer is a hydrogen internal combustion engine system 22. The hydrogen internal combustion engine system 22 generally comprises one or more cylinders 23 having corresponding combustion chamber and reciprocating pistons (not illustrated). As shown in FIG. 2B, the hydrogen circuit system 50 comprises the hydrogen tank 52 in fluid communication with hydrogen internal combustion engine 22. As described in relation to FIG. 2A, the hydrogen consumer, here corresponding to the hydrogen internal combustion engine 22, is in fluid communication with the hydrogen tank 52 via the hydrogen conduit 51, in particular via the hydrogen supply line 51a. In a similar vein, an exhaust side of the hydrogen internal combustion engine 22 is in fluid communication with the hydrogen exhaust line 51b.

Moreover, in FIG. 2B, the controllable vent valve arrangement 58 of the vehicle purging control arrangement 30 is disposed in the hydrogen supply line 51a. The control of the controllable vent valve arrangement 58 and the purging of hydrogen from the hydrogen circuit system 50 via the controllable vent valve arrangement 58 corresponds to the control and purging of hydrogen from the hydrogen circuit system 50 in FIG. 2A. Favourably, although not illustrated in FIG. 2B, the system may also comprise the shut off valve 54 arranged in-between the hydrogen tank 52 and the pressure regulator 53. Hence, the purging of hydrogen from the hydrogen circuit system 50 is here also controlled by the remote-control system 81 of the hydrogen control system 80.

Figure 3:
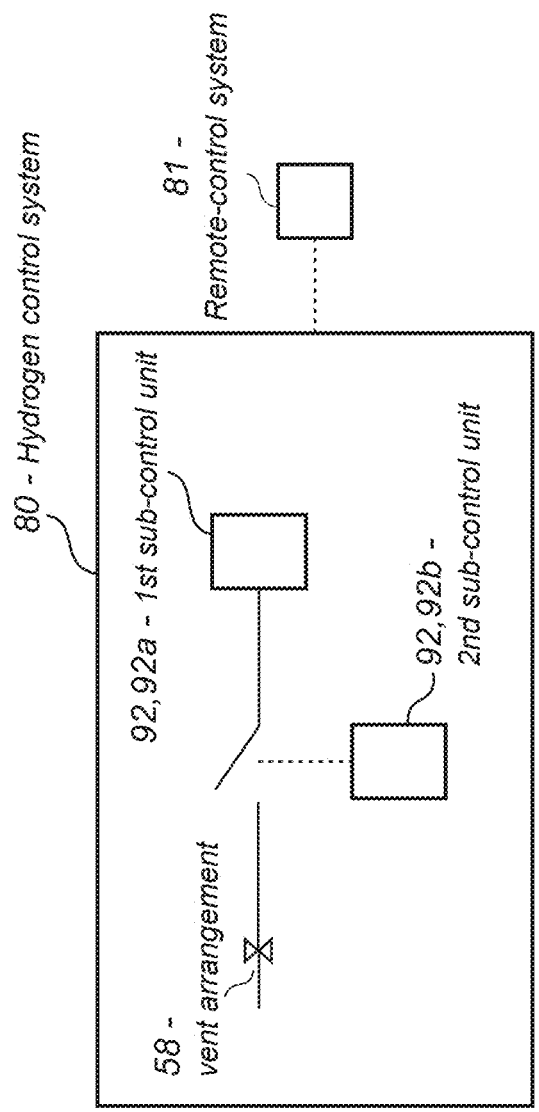
FIG. 3 conceptually illustrates an example embodiment of controlling purging from a vehicle system according to an example embodiment of the disclosure.

In regard to the arrangement of the control unit 92 for any one of the hydrogen control system 80 in FIGS. 2A and 2B, it may also be possible to control purging by a control unit having a first sub-control unit 92a and a second sub-control unit 92b. The first sub-control unit 92a and the second sub-control unit 92b here forms the control unit 92. In FIG. 3, there is depicted an example of a hydrogen control system 80 comprising a plurality of control units in the form of the first sub-control unit 92a and the second sub-control unit 92b. In this example embodiment, the controllable vent valve arrangement 58 is controllable by the first and second control units 92a, 92b. Each one of the first and second control units 92a, 92b is arranged in communication with the remote-control system 81 of the hydrogen control system 80. In addition, each one of the first and second control units 92a, 92b is arranged in communication with the controllable vent arrangement 58 of the hydrogen circuit system 50. By this arrangement, it becomes possible to provide an even more secure control of the controllable vent valve arrangement 58 during operation of the hydrogen circuit system 50, and also during purging of hydrogen from the hydrogen circuit system 50. By way of example, the first sub-control unit 92a is configured to set the control of the controllable vent valve arrangement 58, while the second sub-control unit 92b is configured to enable the control of the control of the controllable vent valve arrangement 58, i.e. to ensure that control signal is forwarded electrically to the controllable vent valve arrangement 58. Hereby, it becomes possible to improve the robustness of the control of the system by reducing the risk of having one of the control functionalities to fail during the purging control of the system 50.

In all example embodiments described in relation to FIGS. 1 to 3, the control unit 92 may be an electronic control unit. By way of example, the electronic control unit 92 is configured to operate the hydrogen consumer, such as the fuel cell system 2o and/or the hydrogen internal combustion engine 22. In addition, the electronic control unit 92 is configured to operate the hydrogen control system 80 as well as any hydrogen purging operation from the hydrogen circuit system 50 in response to the control signal. Moreover, the electronic control unit 92 is configured to operate the hydrogen control system 80 according to any one of the example embodiments of a method, as described in any one of the FIGS. 4 to 5. The control unit 92 is here configured to gather and/or receive operating data relating to the hydrogen circuit system 50 and the pressure level of the hydrogen circuit system 50. The control unit 92 is also configured to transmit the gathered or received data to the processing circuitry 82 of the remote-control system 81 for further processing.

The communication between the control unit 92 and the processing circuitry 82 of the remote-control system 81 can be made by a wire connection, wirelessly or by any other technology such as Bluetooth or the like. Analogously, the communication between the control unit 92, the remote-control system 81 and any sensor at or adjacent the hydrogen circuit system 50 may be made by a wire connection, wirelessly or by any other technology such as Bluetooth or the like. Examples of communication system may thus be any one of a telecommunication mobile network, QR code readable by one camera arranged on the vehicle, wireless remote control system, driver key fob, workshop vehicle interface system, instructions from any type of back office system through a telematic gateway.

Although not illustrated, the remote-control system 81 optionally comprises a user communication device in networked communication with the processing circuitry 82 of the remote-control system 81. By way of example, the user communication device may be a touch screen or a portable device such as cellular phone. The user communication device may in other examples be arranged in a dashboard of the vehicle and/or in another vehicle.

The user communication device is configured to communicate status of the hydrogen circuit system 50 and alert the user of any potential or ongoing hydrogen leakage from the hydrogen circuit system 50 of the vehicle 10. The alert(s) may be in the form of a visual warning that the hydrogen level is below a threshold value. In addition, or alternatively, the alert may contain a digit indicative of the pressure. In response to the alert on the user communication device, a technician may decide to control purging of the hydrogen circuit system 50 as described herein. In other situations, the technician may decide to control purging of the hydrogen circuit system 50 as desired or needed for reasons of upcoming maintenance work.

In the above situations, the remote-control system 81 will be arranged and configured to ensure that all vehicle functions and/or vehicle systems are set into non-ignitable states before initiating purging of hydrogen from the hydrogen circuit system 50.

Figure 4:
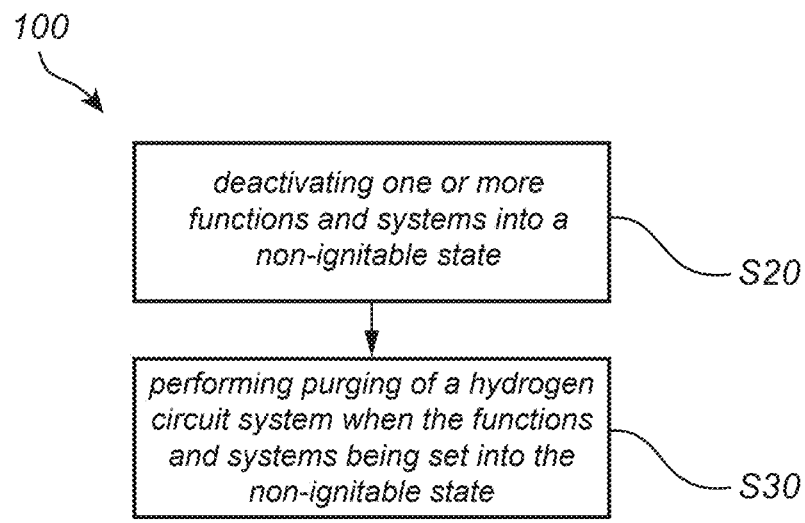
FIG. 4 is a flow-chart of method steps according to an example embodiment of the disclosure.
Figure 5:
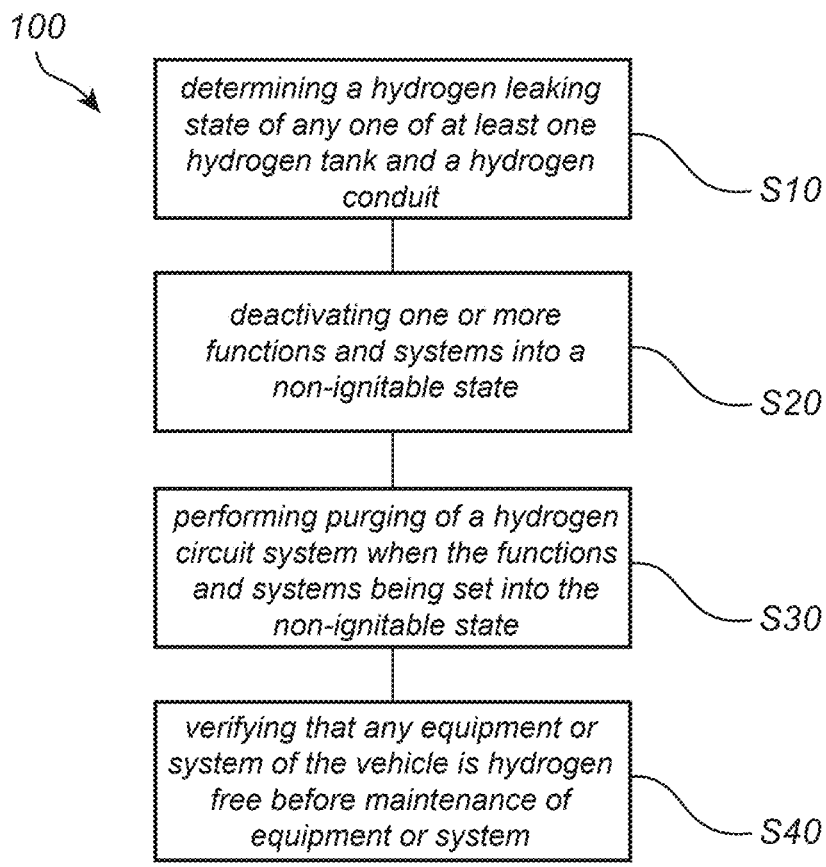
FIG. 5 is a flow-chart of further method steps according to an example embodiment of the disclosure.

In order to describe the hydrogen control system 80 of the vehicle 10 in further detail, reference is now made to FIGS. 4-5 which illustrates various example embodiments thereof. The hydrogen control system 80 is operable by a method according to any one of the example embodiments as described in any one of the FIGS. 4 to 5.

Typically, although strictly not required, the hydrogen control system 80 is controlled by the remote-control system 81 so as to perform the method according to any one of the example embodiments as described in any one of the FIGS. 4 to 5.

Turning now to FIG. 4, there is depicted a flowchart of a method according to an example embodiment of the disclosure. The method 100 is intended for controlling purging of hydrogen from the hydrogen circuit system 50 of the vehicle 10, as described in relation to FIGS. 1, 2A and 2B. The sequences of the method are typically performed by the processing circuitry 82 of the remote-control system 81, as described herein.

In FIG. 4, the method comprises a step of deactivating S20 one or more of the vehicle functions and vehicle systems of the vehicle 10 into non-ignitable states in response to the control signal indicative a of request for purging the hydrogen circuit system 50.

In this example the control signal contains data indicative of hydrogen leaking from the hydrogen conduit 51. Accordingly, by way of example, the method comprises the step of deactivating S20 one or more vehicle functions and vehicle systems into non-ignitable states in response to a control signal indicative of hydrogen leaking from the hydrogen conduit 51.

Subsequently, the method comprises a step of performing S30 purging of the hydrogen circuit system 50 when the one or more vehicle functions and vehicle systems have been set into corresponding non-ignitable states.

By way of example, the actual purging operation of the hydrogen circuit system 50 is performed by the vehicle purging control arrangement 30 in response to the transmitted purging control signal from the remote-control system 81 to the vehicle purging control arrangement 30.

Optionally, the method initially comprises a step of determining S10 a hydrogen leaking state of any one of the at least one hydrogen tank 52 and the hydrogen conduit 51. As mentioned herein, the hydrogen leaking state may be detected and determined in several ways. By way of example, the remote-control system 81 may be arranged in communication with a data acquiring unit (not illustrated) on the vehicle 10. Generally, the control unit of the vehicle may also be arranged in communication with the data acquiring unit.

The data acquiring unit is adapted to gather pressure state etc. from the hydrogen circuit system 50 during use of the vehicle 10. The data acquiring unit may comprise or communicate with a pressure sensor (not shown) arranged adjacent or in the hydrogen circuit system 50 for monitoring the pressure in the hydrogen circuit system 50. In this manner, the hydrogen control system 80 is arranged and configured to monitor the hydrogen circuit system 50 so as to detect if there is any ongoing hydrogen leakage from the conduit 51 of the tank(s) 52.

Depending on the outcome of the above monitoring operation, the hydrogen control system 80 is configured to perform the purging operation of the hydrogen circuit system 50 upon receiving the control signal by operating the purging control arrangement 30.

Another example embodiment of the method is depicted in FIG. 5. The method illustrated in FIG. 5 is based on the sequence of the method according to example embodiment in FIG. 4. In addition, in FIG. 5, there is the initial step of determining S10 a hydrogen leaking state of any one of the at least one hydrogen tank 52 and the hydrogen conduit 51.

Moreover, as illustrated in FIG. 5, the method 100 after step S20 and step S30 here performs the step of verifying S40 that any equipment or system of the vehicle in need of service is free of hydrogen before initiating maintenance of the equipment or system. Typically, the method as illustrated in FIG. 5, may also comprise the step of communicating the advancement of the purging operation to the remote-control system 81.

It should be noted that the example embodiment as described in relation to FIG. 5 may be combined with any one of the steps from the above example embodiments, e.g. the example embodiments described in relation to FIG. 4.

Favourably, data relating to the operations of the hydrogen control system 80 are stored in a memory 84 of the hydrogen control system 80. By way of example, the remote-control system 81 comprises the memory 84. The memory 84 is arranged in communication with the processing circuitry 82 of the remote-control system 81.

While the remote-control system 81 may generally be a stationary remote source operated by a technician or so, it should be noted that the remote-control system 81 and the processing circuitry 82 may likewise be integral parts of another vehicle in communication with the hydrogen circuit system 50 of the vehicle 10. In other examples, the remote-control system 81 is part of a control tower operated by a fleet manager and the like, operating a number of vehicles within a logistics area.

The disclosure also relates to the hydrogen control system 80. The hydrogen control system 80 comprises the remote-control system 81 and the processing circuitry 82. The remote-control system 81 is configured to perform a method according to any one of the example embodiments as described in relation to the FIGS. 4 to 5. In addition, the disclosure relates to the vehicle 10 comprising the hydrogen control system 80 according to any one of the example embodiments as described in relation to the FIGS. 1 to 5. In addition, the disclosure relates to a computer program comprising program code means for performing the steps of the method as described in relation to the FIGS. 4 to 5, when the program is run on a computer. In addition, the disclosure relates to a computer readable medium carrying a computer program comprising program means for performing the steps of the method as described in relation to the FIGS. 4 to 5 when the program means is run on a computer.

Thanks to the present disclosure, as exemplified by the example embodiments in FIGS. 1 to 5, it becomes possible to provide an improved purging control strategy for the vehicle 10 in which a vehicle can be purged from hydrogen in an efficient and reliable manner. In particular, it becomes possible to provide an improved purging control strategy for the vehicle 10 in which a vehicle being subject to a hydrogen leaking can be purged from hydrogen in an efficient and reliable manner.

As mentioned above, it is to be noted that the steps of the method are typically performed by the hydrogen control system 80, including the control unit 81, during use of the vehicle 10. Thus, the hydrogen control system 80 is configured to perform any one of the steps of any one of the example embodiments as described above in relation to the FIGS. 1-5. A control unit may include a microprocessor, microcontroller, programmable digital signal processor or another programmable device. Thus, each one of the control units comprises electronic circuits and connections (not shown) as well as processing circuitry (e.g. processing circuitry 82 or processing circuitry of the control units 90, 92, 92a, 92b) such that the corresponding control unit can communicate with different parts of the truck such as the brakes, suspension, driveline, in particular an electrical engine, an electric machine, fuel cell system, hydrogen internal combustion engine, a clutch, and a gearbox in order to at least partly operate the truck. Each one of the control units may comprise modules in either hardware or software, or partially in hardware or software and communicate using known transmission buses such as CAN-bus and/or wireless communication capabilities. The processing circuitry may be a general purpose processor or a specific processor. Each one of the control units comprises a non-transitory memory for storing computer program code and data upon. Thus, the skilled addressee realizes that each one of the control units may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

It should be noted that the method for controlling purging of hydrogen from the hydrogen circuit system 50 can be performed from several locations, as described herein. Hence, the method for controlling purging of hydrogen from the hydrogen circuit system 50 can be performed remotely by the remote-control system 81 and the processing circuitry 82. However, the method for controlling purging of hydrogen from the hydrogen circuit system 50 can also be performed at least partly from the control unit 92 of the vehicle. In addition, or alternatively, the method for controlling purging of hydrogen from the hydrogen circuit system 50 can also be performed at least partly from a control unit 92 of another vehicle.

In addition, if the method for controlling purging of hydrogen from the hydrogen circuit system 50 is performed remotely by the remote-control system 81 and the processing circuitry 82, the processing circuitry 82 may communicate with any the control units 92 of the vehicle and the hydrogen circuit system 50, which then control the purging control arrangement 30 and its controllable vent valve arrangement(s) 55 and/or 58. Alternatively, or in addition, if the method for controlling purging of hydrogen from the hydrogen circuit system 50 is performed remotely by the remote-control system 81 and the processing circuitry 82, the processing circuitry 82 may communicate directly with the purging control arrangement 30 and its controllable vent valve arrangement(s) 55 and/or 58.

Although the Figures may show a sequence, the order of the steps may differ from what is depicted. Also, two or more steps may be performed concurrently or with partial concurrency. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the present disclosure is not limited to the embodiments described above and illustrated in the drawings; rather, the skilled person will recognize that many changes and modifications may be made within the scope of the appended claims. For example, although the present disclosure has mainly been described in relation to an electrical truck, the disclosure should be understood to be equally applicable for any type of electrical vehicle, in particular an electrical bus, an electrical car or the like. Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling purging of hydrogen from a hydrogen circuit system of a vehicle, the hydrogen circuit system having a hydrogen conduit being arranged in fluid communication with at least one hydrogen tank, the method being implemented by a remote control system from the vehicle, the remote control system being an integral part of a hydrogen control system comprising at least one processing circuitry, the remote-control system being arranged in communication with one or more vehicle functions and vehicle systems and further in communication with a purging control arrangement arranged on the vehicle, the method comprising:
deactivating one or more vehicle functions and vehicle systems into a non-ignitable state in response to a control signal indicative of a request for purging the hydrogen circuit system, and
performing purging of the hydrogen circuit system when the one or more vehicle functions and vehicle systems being set into the non-ignitable state, and in response to & porgo 8.control signal from the remote-control system to the purging control arrangement.

2. The method of claim 1, wherein the vehicle purging control arrangement comprises a controllable vent valve arrangement in fluid communication with the hydrogen circuit system, whereby performing purging of the hydrogen circuit system when the one or more vehicle functions and vehicle systems are set into the non-ignitable state is performed by operating the controllable vent valve arrangement to purge any hydrogen from the hydrogen circuit system.

3. The method of claim 1, wherein the controllable vent valve arrangement is controllable by a plurality of control units arranged on the vehicle and in communication with the at least one processing circuitry.

4. The method of claim 1, further comprising determining a hydrogen leaking state of any one of the at least one hydrogen tank and the hydrogen conduit.

5. The method of claim 1, further comprising verifying that any equipment or system of the vehicle in need of service is free of hydrogen before initiating maintenance of the equipment or system.

6. A computer program comprising program code means for performing the steps of claim 1 when the program is run on a computer or on processing circuitry of a control system.

7. A computer readable medium carrying a computer program comprising program code means for performing the steps of claim 1 when the program product is run on a computer or on processing circuitry of a control system.

8. The method of claim 1, wherein the non-ignitable state is a condition of the vehicle functions and vehicle systems that does not cause a potential-risk for flammability of hydrogen.

9. A hydrogen control system for a vehicle having a hydrogen circuit system comprising a hydrogen conduit arranged in fluid communication with at least one hydrogen tank, the hydrogen control system comprising at least one processing circuitry in communication with a purging control arrangement arranged on the vehicle and configured to control purging of hydrogen from the hydrogen circuit system, wherein the hydrogen control system comprises a remote-control system from the vehicle, the remote-control system being arranged in communication with one or more vehicle functions and vehicle systems and further in communication with the purging control arrangement,
wherein the hydrogen control system is further configured to:
deactivate one or more vehicle functions and vehicle systems into a non-ignitable state in response to a control signal indicative of hydrogen leaking from the hydrogen circuit system, and
perform purging of the hydrogen circuit system when the one or more vehicle functions and vehicle systems are set into the non-ignitable state, and wherein the purging control arrangement is configured to control purging of the hydrogen circuit system in response to a purging control signal from the remote-control system.

10. The hydrogen control system of claim 9, wherein the hydrogen control system is configured to determine an ignitable state of the one or more vehicle functions and vehicle systems, and, for any determined ignitable state of the one or more vehicle functions and vehicle systems, deactivate the one or more vehicle functions and vehicle systems into corresponding non- ignitable states.

11. The hydrogen control system of claim 9, wherein the vehicle purging control arrangement comprises a controllable vent valve arrangement disposed in the hydrogen circuit system, the controllable vent valve arrangement configured to purge any hydrogen from the hydrogen circuit system in response to a control signal indicative of hydrogen leaking from the hydrogen circuit system, and the one or more vehicle functions and vehicle systems is set into the non-ignitable state.

12. The hydrogen control system of claim 11, wherein the controllable vent valve arrangement is disposed in the hydrogen circuit system downstream from a pressure regulator.

13. The hydrogen control system of claim 9, wherein the hydrogen circuit system is in fluid communication with at least one hydrogen consumer.

14. The hydrogen control system of claim 11:
wherein the hydrogen circuit system is in fluid communication with at least one hydrogen consumer, and
wherein the controllable vent valve arrangement is disposed in the hydrogen circuit system downstream from the hydrogen consumer.

15. The hydrogen control system of claim 9, wherein the controllable vent valve arrangement is controllable by a plurality of control units.

16. The hydrogen control system of claim 9, wherein the non-ignitable state is a condition of the vehicle functions and vehicle systems that does not cause a risk for flammability of hydrogen.

* * * * *